Oct. 18, 1966  M. G. BLANKENSHIP  3,279,783
APPARATUS FOR ALIGNING HOLLOW ARTICLES
Filed Oct. 1, 1963  3 Sheets-Sheet 1

INVENTOR.
Michael G. Blankenship
BY
ATTORNEY

Oct. 18, 1966  M. G. BLANKENSHIP  3,279,783
APPARATUS FOR ALIGNING HOLLOW ARTICLES
Filed Oct. 1, 1963  3 Sheets-Sheet 2

INVENTOR.
Michael G. Blankenship
BY
Clarence R. Batty, Jr.
ATTORNEY

Oct. 18, 1966  M. G. BLANKENSHIP  3,279,783
APPARATUS FOR ALIGNING HOLLOW ARTICLES
Filed Oct. 1, 1963  3 Sheets-Sheet 3
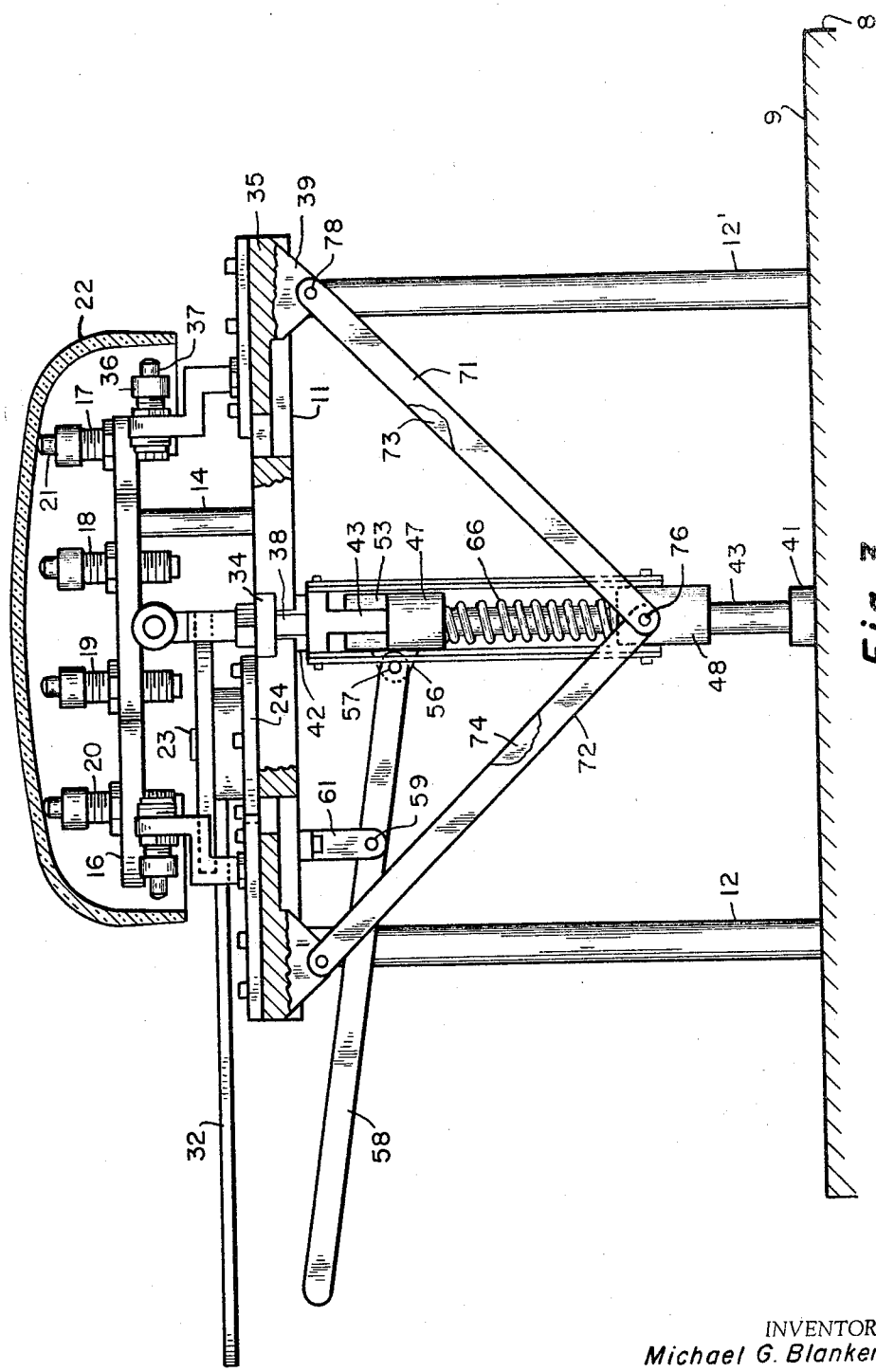
INVENTOR.
Michael G. Blankenship
BY
Clarence R. Patty Jr.
ATTORNEY

United States Patent Office 3,279,783
Patented Oct. 18, 1966

3,279,783
APPARATUS FOR ALIGNING HOLLOW ARTICLES
Michael G. Blankenship, Corning, N.Y., assignor to Corning Glass Works, Corning, N.Y. a corporation of New York
Filed Oct. 1, 1963, Ser. No. 313,014
8 Claims. (Cl. 269—47)

This invention relates to apparatus for precisely aligning and positioning hollow articles. More particularly, the invention relates to apparatus for precisely positioning and aligning, with respect to a selected reference point, skirted or walled panels such as, for example, the glass viewing panels used in the fabrication of television picture tubes.

By way of an example of the present invention, in a television picture tube viewing panel wherein an aperture mask or the like is to be held in a precise position within the cavity of the panel, the mask is often attached and held in such position by a number of metal inserts which are pressed into the inner surface regions of the wall or skirt of the viewing panel at exactly selected points. In order that the metal mask-supporting inserts or devices may be inserted into each of a series of panels at the same exact points on the skirt of each panel, it is necessary, prior to the insertion of the mask-supporting devices, to accurately and identically align each panel in relation to the apparatus employed for the insertion of the devices or inserts.

There is shown and described in Letters Patent of the United States 3,021,643, issued February 20, 1962, to W. S. Blanding et al. for Glass-Metal Uniting Apparatus, an apparatus for aligning television viewing panels in the manner and for the purpose discussed above, the reference point used for alignment of the panels being the approximate geometric center of the cavities in the panels. However, as sometimes occurs, if the walls of the skirt portion of a viewing panel vary somewhat in thickness from point to point on such walls, when the panel is attempted to be aligned by the apparatus shown in said patent, precise alignment of the panel may not, due to said variations in wall thickness, be attained. It is believed that this will be apparent to those skilled in the art by a brief study of the apparatus of the patent. However, as an example, and referring to FIG. 1 of the patent, if a pair of diametrically opposite slides, such as 23, causes the buttons 31 of the respective branches, such as 25 and 26 of such slides, to engage opposite interior sidewalls of the cavity of panel P prior to the engagement of such walls by the buttons associated with the other diametrically opposite pair of slides and associated branches, the panel may not become aligned since, under such conditions, said other diametrically opposite pair of slides cannot cause their associated buttons, such as 31, to engage the panel walls and move the panel when such movement is necessary for proper alignment thereof. The reason for such occurrence under such conditions is that the engagement of the opposite panel walls by the buttons of the first opposite set of slides and associated branches prevents further movement of any of the slides.

Accordingly, it is an object of the present invention to provide a novel apparatus which will properly align skirted or walled panels with respect to a reference point, as discussed above, such apparatus, during such alignment, also automatically making allowance for a difference in wall thickness at each point on the panel engaged by the apparatus in the process of aligning the panel, as compared to the panel wall thickness at each of the other of such points.

In accomplishing the above object of the invention, there is provided a panel alignment apparatus including a plurality of panel wall engaging devices which are actuated by resilient means, such means permitting engagement of the panel walls by one or more of said devices without preventing further movement of the remaining devices in their actuation toward engagement of the panel walls and the aligning of the panel.

Other objects and characteristic features of the invention will become apparent as the description proceeds.

The invention will be described in detail with reference to the accompanying drawings wherein:

FIG. 3 is an end elevational view of the apparatus taken on line III—III of FIG. 1, and with parts omitted for purposes of simplicity and with parts broken away to show details.

Similar reference characters refer to similar parts in each of the figures of the drawings.

Figure 1:
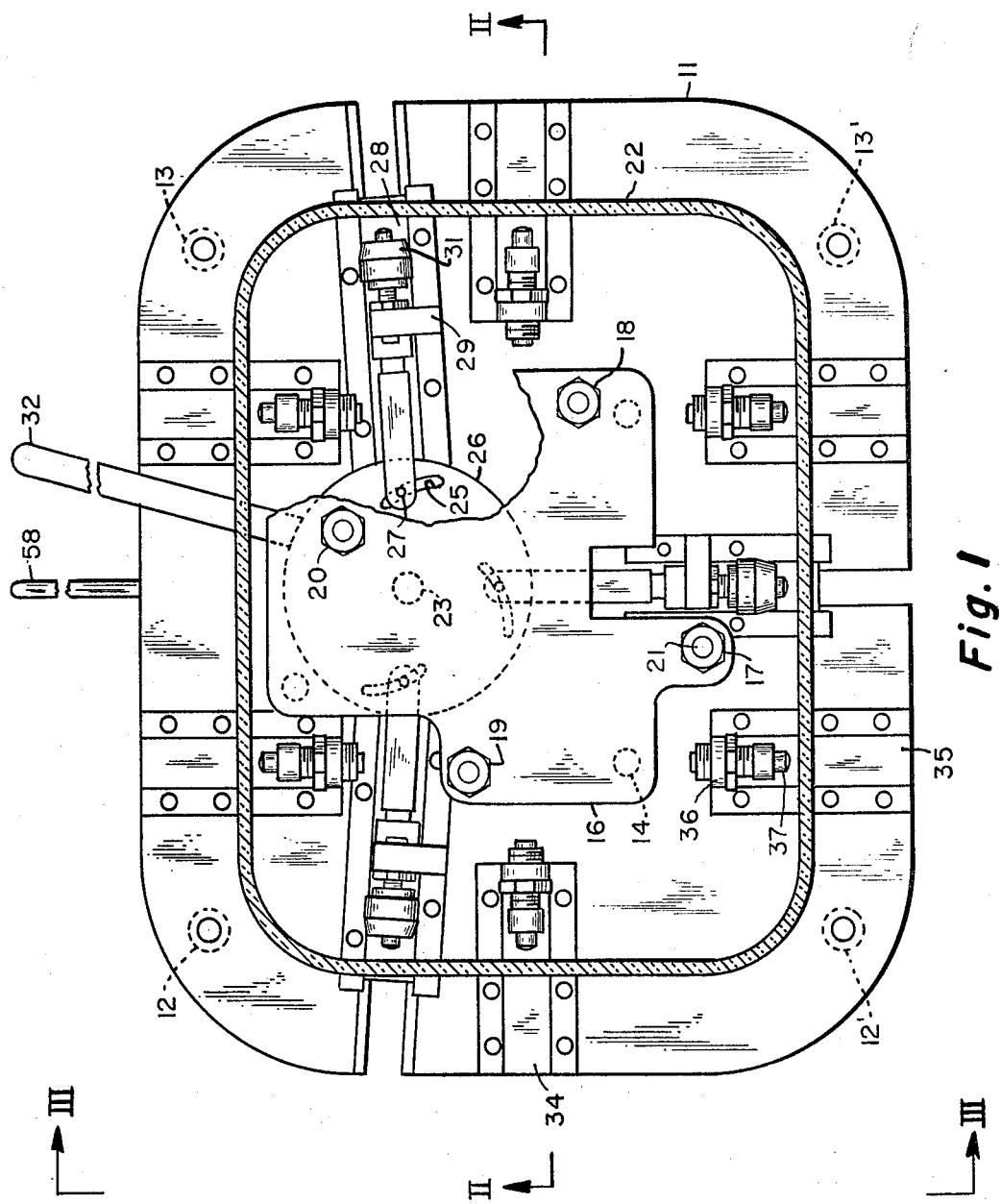
FIG. 1 is a top plan view of an apparatus embodying the invention and including a sectional view of a panel taken through its side wall or skirt.

Referring to the drawings in detail, the apparatus comprises a suitable table 8 (FIG. 2) having a top 9 above which a base plate 11 is supported by suitable legs (FIGS. 3, 1 and 2) such as 12, 12', 13 and 13'. Supported on base plate 11, by supports such as 14, is a second plate 16, having passing therethrough, four upstanding posts 17, 18, 19 and 20 (FIG. 3) which are provided at their upper ends with carbon buttons such as 21. A skirted article 22, which may be the skirted viewing panel of a television picture tube, is supported by and upon said carbon buttons in the manner illustrated in FIGS. 2 and 3.

There is provided on the upper surface of plate 11, in the space between such upper surface and the lower surface of plate 16, a cam support shaft 23 surrounded by a bearing journal 24. Pivotally arranged on the upper end of shaft 23 is a cam 26 to which is coupled, by means of pins such as 27 extending through arcuate slots such as 25 (FIG. 1) provided in cam 26, cam followers or burner supporting slides, such as 28, arranged in slots or slideways provided in plate 11. Each such cam follower or slide carries a burner assembly, such as 29, including a vacuum chuck 31 for receiving a metal insert, the chuck and insert being surrounded by gaseous fuel outlets for directing flames toward the insert and toward the interior surface of the skirted portion of panel 22 into which the insert is to be inserted. The details of the burner assembly, chuck and insert are not shown in the drawings since they form no part of the present invention. The burner assembly and chuck are included in the drawings merely to make this description complete and reference may be made to the previously mentioned Blanding et al. patent, if desired, for a more detailed showing and description of one arrangement of such parts that may be used.

A lever 32 (FIGS. 1 and 3) is secured at one of its ends to the cam 26 and enables the cam to be turned to advance the cam followers, such as 28, and their associated burner assemblies, such as 29, toward the skirted article or panel 22 for the sealing of a metal insert therein following the proper positioning of the panel by the apparatus comprising the invention and discussed below. The apparatus just discussed is shown and described merely for the purpose of giving one example of the utility of the invention.

Plate 11 is also provided around its outer perimeter with a number of pairs of oppositely disposed slideways or slots normal to such perimeter and aligned in an H configuration, and each provided with a slide, such as 34 or 35 upon which is mounted a panel-positioning device, such as 36, each such device having a panel-engaging carbon button such as 37. The bottoms of the slides, such as 34 and 35, are provided with lugs, such as 38 and 39, respectively, which extend downwardly through the respective slots and are employed, as hereinafter discussed, for sliding actuation of the slides within their associated slots or slideways, such actuation of the slides also actuating the associated panel-positioning devices as will become apparent later in this description.

On the top 9 of table 8 is provided a first guide block 41 and disposed on the bottom of plate 11 directly above block 41 there is provided a second guide block 42, such blocks being provided with holes for supporting first, second and third vertical guide shafts or bars designated 43, 44 and 45, respectively. Guide shaft 43 is provided with a pair of guide shaft follower blocks designated 47 and 48 which are provided with holes through which the shaft 43 extends, such blocks being arranged so as to snugly fit around the shaft in a slidable relationship therewith. Guide shaft 45 is provided with follower blocks 51 and 52 which are similar to those provided on shaft 43 and which are slidably movable on their associated shaft. Shaft 44 is also provided with a pair of upper and lower guide shaft follower blocks designated 53 and 54, respectively, and which are arranged to operate on their respective shaft in a manner similar to the blocks provided on shafts 43 and 45. Lower block 54 is similar to the lower blocks 48 and 52 provided on shafts 43 and 45, but upper block 53 is somewhat longer than the upper blocks 47 and 51, and is also provided with a lug 56 (FIG. 3) to which is pivotally connected, as by a pin 57, one end of a lever 58. Lever 58 is pivotally connected at a point between the ends thereof, as by a pin 59, to a bracket 61 provided on the under side of plate 11, the free end of the lever extending out from under and substantially beyond the outer perimeter of plate 11.

Figure 2:
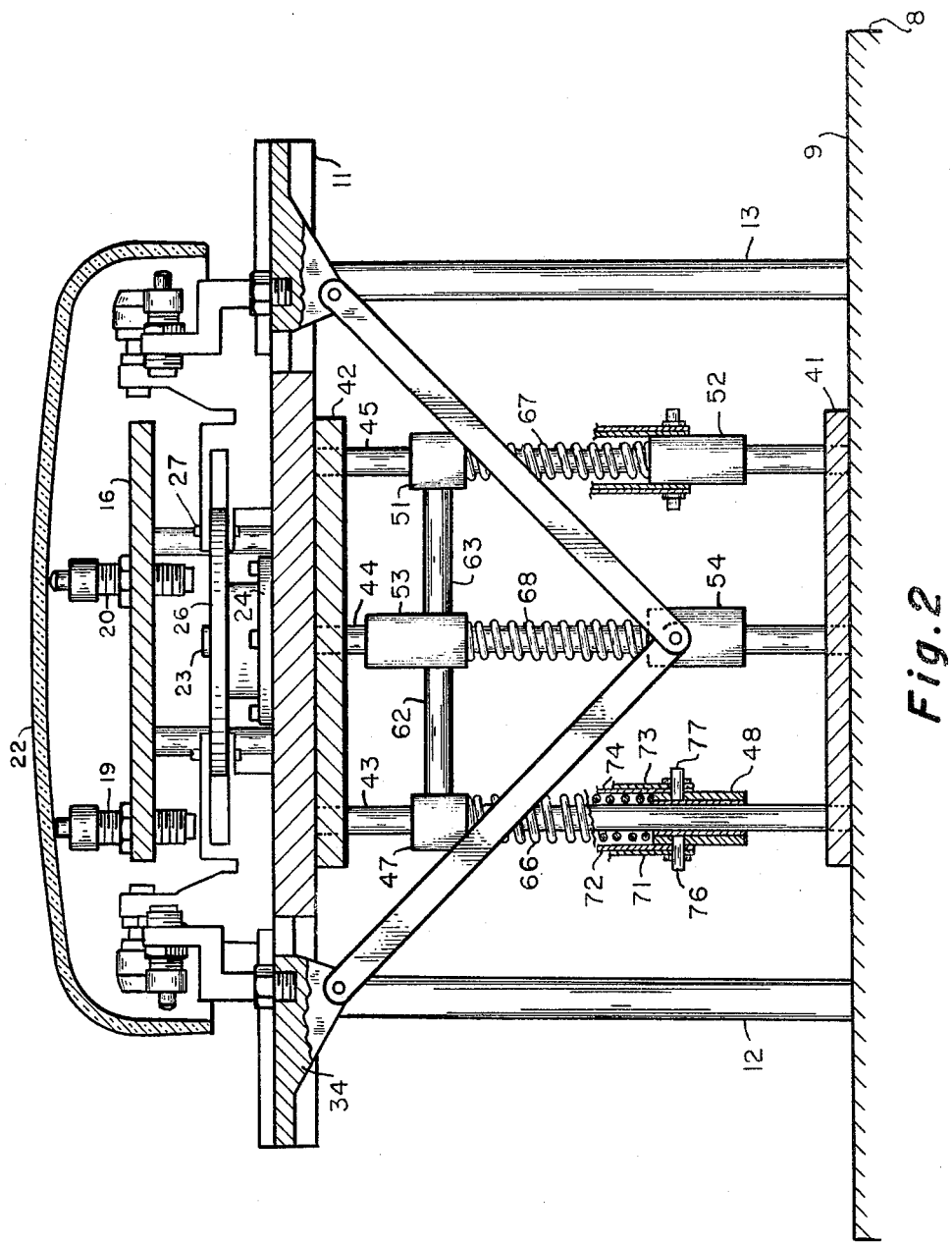
FIG. 2 is a part sectional side elevation view of the apparatus showing a panel thereon and taken on line II—II of FIG. 1.

Referring to FIG. 2, the upper guide shaft follower blocks 47 and 51 are each securely connected to the center of upper guide shaft follower block 53 as by arms 62 and 63, respectively, and it will be readily apparent that any vertical movement of block 53 along its associated shaft 44 will also be imparted to blocks 47 and 51 to cause them to vertically slide on their associated shafts. The vertical sliding of block 53 on shaft 44 is occasioned by the actuation of lever 58, as is obvious by reference to FIG. 3 of the drawings. Guide shaft follower blocks 47 and 48 are resiliently connected to each other, as by a coil spring 66 (FIGS. 2 and 3) surrounding guide shaft 43. Similarly, the associated follower blocks 51 and 52, and 53 and 54 provided on guide shafts 45 and 44, respectively are resiliently connected to each other as by coil springs 67 and 68, respectively, surrounding shafts 45 and 44. By this arrangement any upward movement, imparted to shaft follower block 53 by the downward actuation of the free end of lever 58, is likewise imparted to blocks 47 and 51, and the upward movement of blocks 47, 51 and 53 supplies tension to the respectively associated coil springs 66, 67 and 68 to cause similar upward movement of lower shaft follower blocks 48, 52 and 54. The purpose of such arrangement will become more apparent hereinafter.

Two pairs of actuating arms, such as 71 and 72, and 73 and 74 (FIGS. 2 and 3) are pivotally connected at first ends thereof, as by pins 76 and 77, to opposite faces of each of the shaft follower blocks 48, 52 and 54. The other ends of each such pair of arms are pivotally connected, as by pins 78, to the lugs, such as 38 and 39 (FIG. 3) provided on the bottoms of the correspondingly disposed slides, such as 34 and 35. This arrangement will be apparent from a brief glance at the drawings and it will be readily understood that any upward or downward movement of a shaft follower block, such as 48 (FIG. 3) will cause the associated actuating arms, such as 71 and 72, to further spread apart or retract, respectively, the associated pair of oppositely disposed panel-positioning devices previously discussed.

Although undoubtedly apparent to those skilled in the art, it is pointed out that springs 66, 67 and 68 are so selected that, in the normal condition of the apparatus as illustrated in the drawings, such springs are slightly compressed between the respectively associated pairs of guide shaft follower blocks 47 and 48, 51 and 52, and 53 and 54. Such compression of springs 66, 67 and 68 occurs due to the weight of follower blocks 47, 51 and 53, and arms 62 and 63, causing such blocks to bear downwardly against such springs. Follower blocks 48, 52 and 54 cannot be moved downwardly any further than illustrated in the drawings since, under the normal condition of the apparatus illustrated, the inner ends of the slides, such as 34 or 35, are bearing against the inner limits of their respective slideways in plate 11. Thus, springs 66, 67 and 68 are normally slightly compressed, thereby causing each such spring to normally exert a compressional force to maintain the respective panel-positioning devices coupled thereto in their panel non-engaging positions as shown in the drawings.

An operational example of the invention will now be described.

A skirted panel, such as a television picture tube viewing panel 22, is placed so that the surface of the planar portion of the panel, interior of the cavity in the panel, rests upon the buttons, such as 21, provided on the top of the upright supports 17, 18, 19 and 20 (FIGS. 2 and 3). As shown in FIGS. 2 and 3, when a panel, such as 22, is so disposed and supported, the cavity in the panel, formed by the depending skirt portion thereof, surrounds the panel-positioning devices such as 36 and their associated panel-engaging buttons, such as 37.

Following the placing of the panel, as described above, the free end of lever 58 (FIG. 3) is actuated in a downward direction to raise shaft follower block 53, as well as the shaft follower blocks 47 and 51 (FIG. 2) securely connected to block 53. Such movement of blocks 53, 47 and 51 relieves the compression of coil springs 68, 66 and 67 and supplies tension to such springs to pull the lower shaft follower blocks 48, 52 and 54 upwardly. The upward movement of such lower blocks actuates the respectively associated arms, such as 71 and 72, to equally spread further apart each associated pair of panel-positioning devices, such as 36. That is, such panel-positioning devices are, at such times, moved towards the interior sidewalls of the skirted portion of the panel, such as 22, so that the panel-engaging buttons, such as 37, may engage said interior sidewalls.

When the panel-positioning devices, through their associated panel-engaging buttons, contact the interior sidewalls of a panel, such as panel 22, if the panel is not supported upon the buttons, such as 21, provided on the top of the supporting posts 17, 18, 19, and 20, so that the cavity in the panel is symmetrically positioned with reference to the previously mentioned H configuration alignment of the panel-positioning devices, the panel-engaging buttons first engaging the sidewalls of the panel, move the panel laterally and, if necessary, rotationally to correctly position and align the panel. As is readily apparent, the engagement of the opposite sidewalls of the panel by the panel-engaging buttons of a pair of oppositely disposed panel-positioning devices does not prevent further operation to a panel-engaging position of the remainder of the panel-positioning devices and their associated buttons. Such further movement of said remainder of the panel-positioning devices can be attained due to the resilient means or coil springs 66, 67 and 68 associated with each pair of the positioning devices.

It is pointed out that the midpoint of the crossbar of the previously mentioned H cnofiguration alignment of the panel-positioning devices comprises a reference point in respect to which a panel, such as 22, may be positioned and aligned.

It will be readily apparent to those skilled in the art that, with the apparatus of the invention herein shown and described, panels having depending skirt portions may be properly positioned and aligned in respect to a reference point. The planar surface portion of the panels with which the apparatus may be employed may have any bilaterally symmetrical shape such as square, oblong, or elliptical or oval, so long as the dimensions of such surface are within the limits of the area of movement of the panel-positioning devices. It is also well within the scope of the invention to vary the area of movement of any one or more of the pairs of panel-positioning devices to provide an apparatus that can be employed for positioning skirted bilaterally symmetrical articles having, for example, extremely elongated oval or elliptical shaped planar surfaces.

Although there is herein shown and described only one form of apparatus embodying the invention, it is to be understood that various changes and modifications may be made therein without departing from the spirit and scope of the appended claims.

I claim:

1. Apparatus for laterally and rotationally positioning in respect to a reference point, the geometric center of the cavity of a bilaterally symmetrical panel having a depending skirt portion forming such cavity, said apparatus comprising; a plate provided with three pairs of spaced-apart slideways aligned in an H configuration, the alignment of the slideways of the first and of the second of said pairs defining the uprights of such configuration, the alignment of the slideways of the third pair defining the crossbar of the configuration, and the mid-point of such crossbar defining said reference point; a panel-positioning device in each said slideway, each such device being slidably and equally movable in its respective slideway to alternatively engage or disengage the sidewalls of said skirt portion forming said cavity; spring means associated with each of said pairs of slideways, each spring means being coupled with the panel-positioning devices in its associated pair of slideways and normally exerting a first force to maintain such devices in equal-distant panel non-engaging positions; and means for cooperatively actuating each of said spring means to relieve said first force and exert a second force to slidably and equally move the associated panel-positioning devices to a panel-engaging position.

2. Apparatus in accordance with claim 1 wherein each of said spring means comprises a coil spring.

3. Apparatus in accordance with claim 1 wherein each of said spring means comprises a coil spring, said first force is a compressional force and said second force is a tensional force.

4. Apparatus in accordance with claim 1 wherein said spring actuating means comprises a manually operable lever.

5. Apparatus in accordance with claim 1 wherein each of said spring means comprises a coil spring and said spring actuating means comprises a manually operable lever.

6. Apparatus in accordance with claim 1 wherein said panel comprises a skirted viewing panel for a rectangular television picture tube.

7. A horizontally disposed plate having thereupon a plurality of upstanding supports of equal height for horizontally supporting a bilaterally symmetrical panel having a depending skirt forming a cavity in the panel, such plate being provided with three pairs of spaced-apart slideways arranged in an H configuration, the alignment of the slideways of the first and of the second of said pairs defining the uprights of such configuration, the alignment of the slideways of the third pair defining the crossbar of the configuration, and the center point of such crossbar defining a reference point; a panel-positioning device in each said slideway, each said device being equally movable in its respective slideway to engage or disengage the sidewalls of the skirt depending from said panel; a coil spring associated with each of said pairs of slideways and equally coupled with the panel positioning devices in the respective slideways, and lever means coupled to said coil springs for cooperatively and equally moving the panel positioning devices associated with each coil spring alternatively into or out of engaging relationship with said sidewalls, whereby the center of the cavity in said panel, when said devices engage said sidewalls, is laterally and rotationally positioned in respect to said reference point.

8. Apparatus in accordance with claim 7 wherein said panel comprises a skirted viewing panel for a rectangular television picture tube.

References Cited by the Examiner

UNITED STATES PATENTS

| | | | |
|---|---|---|---|
| 2,174,866 | 10/1939 | Barnes | 279—2 |
| 2,277,128 | 3/1942 | Miller | 279—2 |
| 2,822,777 | 2/1958 | Colchagoff | 279—2 |
| 3,021,643 | 2/1962 | Blanding | 65—154 |

ROBERT C. RIORDON, *Primary Examiner.*

B. S. MOWRY, *Assistant Examiner.*